United States Patent [19]
Mori et al.

[11] 4,086,295
[45] Apr. 25, 1978

[54] POLYAMIDE COMPOSITION

[75] Inventors: Taketoshi Mori; Susumu Goto; Asaichi Katsuragi; Mutsuo Matsuki, all of Nobeoka, Japan

[73] Assignee: Asahi Kasei Kogyo Kabushiki Kaisha, Osaka, Japan

[21] Appl. No.: 751,925

[22] Filed: Dec. 16, 1976

[51] Int. Cl.² .............................................. C08L 77/00
[52] U.S. Cl. ............................ 260/857 L; 260/830 P; 260/837 R; 260/836
[58] Field of Search .................................... 260/857 L

[56] References Cited

U.S. PATENT DOCUMENTS

| | | | |
|---|---|---|---|
| 3,676,400 | 7/1972 | Kohan | 260/857 L |
| 3,833,708 | 9/1974 | Miller | 260/857 L |
| 3,845,163 | 10/1974 | Murch | 260/857 L |
| 3,963,799 | 6/1976 | Starkweather | 260/857 L |

FOREIGN PATENT DOCUMENTS

| | | | |
|---|---|---|---|
| 740,501 | 8/1966 | Canada | 260/857 L |
| 6,705,238 | 6/1967 | Netherlands | 260/857 L |
| 6,705,239 | 6/1967 | Netherlands | 260/857 L |
| 7,103,319 | 9/1971 | Netherlands | 260/857 L |

*Primary Examiner*—Paul Lieberman
*Attorney, Agent, or Firm*—Burgess, Dinklage & Sprung

[57] ABSTRACT

A polyamide composition comprised of a mixture of 65–95% by weight of polyamide and 35–5% by weight of a copolymer of ethylene series containing unsaturated carboxylic acid components, the mixture having incorporated thereto 0.1–5% by weight of a carbonate compound such as ethylene carbonate or an epoxy compound such as butyl glycidyl ether. This composition is excellent in impact-strength and is thus suitable for use in interior or exterior parts of automobiles and housing materials.

17 Claims, No Drawings

4,086,295

POLYAMIDE COMPOSITION

BACKGROUND OF THE INVENTION

The present invention relates to a novel polyamide composition excellent in impact strength which comprises a mixture of polyamide and a copolymer of ethylene series, the mixture having incorporated thereinto a carbonate compound or a compound having an epoxy group or groups.

In general, polyamide is excellent in heat-resisting property, abrasion-and wear-resistance and electric characteristics. In particular, polyamide incorporated with an inorganic filler such as glass fibers or mineral powders is improved in heat-resistance, rigidity and mechanical properties. Thus, polyamide has been expected to find vairous uses as industrial resin utilizing these advantageous characteristic properties. Actually, however, the uses of polyamide are considerably limited because of its poor impact strength.

Proposed now to improve such poor inpact strength of polyamide is for example, blending 50-99% by weight of polyamide with 1-50% by weight of an olefin-unsaturated acid copolymer in which at least 10 percents of the unsaturated acid are neutralized with a metal ion (U.S. Pat. No. 3,845,163).

However, polyamide compositions obtained by the prior art methods wherein polyamide is reinforced with inorganic fillers to improve strength and rigidity of the polyamide had such a drawback that impact strength of the polyamide composition was seriously deteriorated instead. In addition, mere incorporation of a copolymer of thylene seires into polyamide was found disadvantageous in that the improving effect in modification of the properties was not significant. For the reasons referred to above, a polyamide composition fully satisfied from the viewpoint of improvement in impact strength has not yet been developed hitherto. Thus, there is still a great demand for developing a polyamide composition improved in various physical properties, in particular impact strength.

As a result of extensive researched made to overcome the drawbacks of the prior art polyamide compositions, the present invention has been accomplished.

BRIEF SUMMARY OF THE INVENTION

In accordance with the present invention, there is provided a polyamide composition composed of a mixture of 65-95% by weight of polyamide and 35-5% by weight of a copolymer of ethylene seires containing unsaturated carboxylic acid components, the mixture having incorporated thereinto 0.1-5% by weight of at least one selected from the group consisting of a carbonate compound and a compound having an epoxy group or groups.

Accordingly, it is an object of the present invention to provide a polyamide composition improved remarkably in impact strength.

It is another object of the present invention to provide a polyamide composition impact strength of which is not deteriorated even in the event the composition is incorporated with inorganic fillers for the purpose of improving strength and rigidity.

It is still another object of the present invention to provide a polyamide compositon suitable for use in interior and exterior parts of automobiles, electric tools, housing materials and the like.

It is further object of the present invention to provide a polyamide composition which, by incorporation with a plasticizer such as glycerol, becomes effective to prevent reduction of melt fluidity and to improve impact strength in wet state.

Other and further objects, features and advantages of the invention will appear more fully from the following description.

DETAILED DESCRIPTION OF THE INVENTION

The polyamide used in this invention includes all of the linear high molecules having the acid amido linkage —CONH—. These polyamides are prepared by polycondensing a diamine with a dicarboxylic acid. Examples of the polyamides prepared by this method include polyhexamethyleneadipamide and polyhexamethylenesebacamide. These polymides are also prepared by decyclopolymerization of lactams. Examples of the polyamides prepared by this method include polycaprolactam and polydodecaneamide.

The polyamides may be copolymeric polyamides or a mixture of at least two polyamides.

The copolymer of ethylene series used in this invention is usually composed of an ethylenic hydrocarbon, an unsaturated carboxylic acid and a metal salt of an unsaturated carboxylic acid. The copolymer may contain a vinyl monomer such as an unsaturated carboxylic acid ester or vinyl acetate, in addition to the above mentioned constituents. The ethylenic hydrocarbon is preferably one having 1-4 carbon atoms, more preferably ethylene. The unsaturated carboxylic acid desirably has 3-8 carbon atoms. Illustrative of the unsaturated carboxylic acid are, for example, acrylic acid, methacrylic acid, α-ethylacrylic acid, malic acid and itaconic acid. Metals capable of forming the metal salt includes Na, K, Mg, Ca, Ba, Zn and the like.

In the copolymer of ethylene series, the proportion of the ethylenic hydrocarbon is desirably 85-98 mol%, preferably 88-96 mol %.

In the case of the copolymer of ethylene series containing ethylenic hydrocarbon less than 85 mol %, its starting base copolymer can hardly be prepared by polymerization apparatus for high pressure process polyethylene. Further, if the proportion of ethylenic hydrocarbon becomes more than 98 mol % in the copolymer of ethylene series, the resultant shaped article will not be improved enough in impact strength.

The molar ratio of the metal salt of unsaturated carboxylic acid to that of a total of the unsaturated carboxylic acid and the metal salt of unsaturated carboxylic acid is 5-90 mol %, preferably 40-80 mol %.

In case that the ratio of the metal salt of unsaturated carboxylic acid is less than 5 mol %, the melt fludity during shaping of the present invention composition is low, while in case that the ratio becomes more than 90 mol %, the resultant shaped article can not be improved sufficiently in impact strength.

The copolymer of ethylene series used in this invention is prepared by any of the generally known methods which includes, for example, a method disclosed in U.S. Pat. Nos. 3,264,272 and 3,789,035.

The carbonate compound used in this invention is represented by the following general formula:

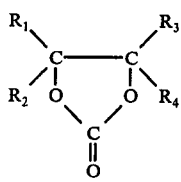

wherein $R_1$, $R_2$, $R_3$ and $R_4$ are the same or different and each stands for a hydrogen atom or an alkyl group. Examples of the carbonate compound include ethylene carbonate, propylene carbonate, butylene carbonate and the like.

The epoxy compound used in this invention is a compound having at least one epoxy group in the molecule. Illustrative of such epoxy compound are, for example, glycidyl ethers of the general formular:

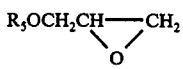

glycidyl esters of the general formula:

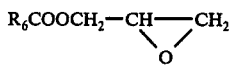

alicyclic epoxides of the general formula:

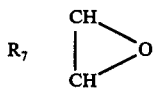

and epoxy compounds of the general formula:

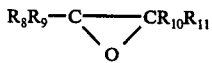

In these formulas, $R_5$, $R_6$, $R_7$, $R_8$, $R_9$, $R_{10}$ and $R_{11}$ are the same or different and each stands for a hydrogen atom or an alkyl group. However, the epoxy compound used in this invention is not limited to these compounds. Compounds having at least two epoxy groups per molecule may of course be used as the epoxy compound.

In the composition of this invention, the proportion of the polyamide to the copolymer of ethylene series is such that the polyamide is 65-95 parts by weight while the copolymer is 5-35 parts by weight. The proportion of the composition is preferably 70-85 parts by weight of the former and 15-30 parts by weight of the latter. If the proportion of the copolymer of ethylene series is less than 5 parts by weight, improvement in impact strength of the composition will be not satisfactory. On the other hand, if the proportion of the copolymer is more than 35 parts by weight, melt fluidity of the composition will seriously be damaged and tensile strength and thermal deformation temperature will also be decreased.

A compound or compounds selected from the carbonate compounds and the compounds having at least one epoxygroup are preferably 0.1–5.0 parts by weight, more preferably 0.5–3.0 parts by weight based on a mixture of the polyamide and the copolymer of ethylene series. If the proportion is less than 0.1 parts by weight, improvement in impact strength is not satisfactory. On the other hand, if the proportion is larger than 5.0 parts by weight, melt fluidity of the composition will seriously be damaged.

In the present invention, the function mechanism of the carbonate compound and the epoxy compound is still unclear. It is surmised, however, that these compounds cause a certain type of reaction with the polyamide and the copolymer of ethylene series on preparation of the composition of this invention by mixing the constituents in molten state, whereby the affinity of the polyamide to the copolymer is enhanced so that impact strength of the composition is remarkably improved.

The composition of this invention may be incorporsted, if desired, with various additives such as plasticizers, thermal degradation-preventing agents, UV-ray degradation-preventing agents, dyes, pigments and the like substances. Of these additives, plasticizers such as glycerol, monostearic acid glyceride, distearic acid glyceride, tristearic acid glyceride, polyethylene glycol, higher alcohols (straight chain alcohols having 10–30 carbon atoms) and ethylene-bis(stearylamide) are useful for the composition of this invention, particularly for the reason that these plasticizers serve not only to prevent deterioration of the composition of this invention in melt fluidity but also to enhance impact strength of the composition in moist state.

The amount of the plasticizers added is preferably within a range of 0.1–3.0 parts by weight based on the total of the polyamide and the copolymer of ethylene series.

The composition of this invention may further be incorporated with a reinforcing inorganic substance or substances to further improve various physical properties of the composition.

Illustrative of the reinforcing inorganic substance are, for example, glass fibers, glass beads, calcium silicate represented by wollastonite, magnesium silicate represented by talc, aluminum silicate represented by kaolin and clay, diatomaceous earth, magnesium phosphate, titanium phosphate, calcium carbonate, calcium sulfate, calcium sulfite, magnesium hydroxide, aluminum chloride, titanium chloride and asbestos. Such reinforcing inorganic substance can be used after activating the surface thereof, for example, by the treatment with an organosilane compounds or organoborane compounds or by thermal treatment. The proportion of the reinforcing inorganic substance is desirably within a range of 20–150 parts by weight, preferably 40–100 parts by weight based on a mixture of the polyamide and the copolymer of ethylene series.

For manufacturing of the polyamide composition, usually, a melt extrusion method using a single screw or thin screw extruder is employed.

The polyamide composition of the present invention is shaped by a variety of methods into films, sheets and the like forms suitable for the intended purpose.

Adopted for manufacturing the polyamide composition having been incorporated with a reinforcing inorganic substance are (1) a method wherein the polyamide, the copolymer of ethylene series, the carbonate compound (and/or the epoxy compound) and the reinforcing inorganic substance are mixed and molten together at the same time and (2) a method wherein a polyamide composition composed of the polyamide, the copolymer of ethylene series and the carbonate compound (and/or the epoxy compound) is first prepared and the polyamide composition is incorporated with the reinforcing inorganic substance. Furthermore a method wherein molding pellets of a composition composed of the polyamide, the copolymer of ethylene series and the carbonate compound (and/or the epoxy compound) and molding pellets of the reinforcing inorganic substance are separately prepared and both pellets are mixed and molten at the time of shaping the composition, can be adopted.

The present invention will now be illustrated in more detail by way of examples wherein the mechanical properties and melt fluidity were measured according to the methods described hereinunder.

[1] MECHANICAL PROPERTIES

After shaping the polyamide composition, a test piece thereof was at once allowed to stand for 24 hours over silicagel in a desiccator placed in a constant temperature room (23° C) and then subjected to measurements.

(1) TENSION TEST

The measurement was performed according to ASTM-D-638 with a crosshead speed of 50 mm/min.

(2) IZOD IMPACT TEST

The measurement was performed according to ASTM-D-256.

(3) DROP HAMMER IMPACT TEST

Test piece: a small flat panel (size: 130×110×3 mm)
Test conditions: curvature of the tip of the hammer 20 mm height of elevated hammer 50 mm
Impact strength: impact strength value at 50% fracture

[2] MELT FLUIDITY

The measurement was performed after controlling the moisture content of the molding pellets to 0.80–0.10% by weight.

(1) MELT FLOW RATE

The measurement was performed according to ASTM D-1238-65T, Procedure B.

| | |
|---|---|
| Measurement temperature: | 275° C |
| Measurement load: | 1775 g |

(2) SPIRAL FLOW DISTANCE

| | |
|---|---|
| Test piece: | 15 mm in width |
| | 2 mm in thickness |
| | 1340 mm in full length |
| Condition: | The flow length of the test piece under an injection pressure of 80 kg/cm²G was measured. |
| Measurement Temperature: | $MH_1$ 270° C, $MH_2$ 275° C, DH |
| Metal mold temperature: | 80° C |

EXAMPLE 1

[Polyamide]

Polyhexamethyleneadipamide
Relative viscosity in formic acid (JIS-K-6810) 52
Terminal groups: amino groups 53 meq/kg carboxyl groups 55 meq/kg

[COPOLYMER OF ETHYLENE SERIES]

A colymer of ethylene with methacrylic acid, the carboxylic group of which are partly converted into zinc carboxylate groups

| | |
|---|---|
| Ethylene unit (mol %): | 92.1 |
| Methacrylic acid unit (mol %): | 7.9 |
| Neutralization degree = | $\frac{[COOZn]_{mol}}{[COOH]_{mol} + [COOZn]_{mol}} \times 100 : 44$ |
| Melt index (g/10 min.): | 0.5 (190° C : 2.16 kg) |

[CARBONATE COMPOUND]

Ethylene carbonate (manufactured by Kishida Kagaku KK, Japan)

A mixture of 20.0 kg of the polyamide and 5.0 kg of the copolymer of ethylene series was incorporated with the ethylene carbonate in an amount of 0.250 kg (Exp. 2), 0.500 kg (Exp. 3), 0.750 kg (Exp. 4) or 1.750 kg (Exp. 5) and the whole was molten and mixed at 270° C using a 70 mmφ extruder (L/D=30). A mixture of 20.0 kg of the polyamide and 5.0 kg of the copolymer of ethylene series alone was also molten and mixed (Exp. 1) for comparison.

The polyamide compositions thus obtained were then examined to measure their Izod impact strength, melt flow rates and tensile yielding strength. A result of the measurement is shown in Table 1.

Table 1

| Exp. No. | Ethylene Carbonate (PHr) | Physical properties | | | |
|---|---|---|---|---|---|
| | | Izod impact strength (kg.cm/cm) | Melt flow rate | | Tensile yielding strength (kg/cm²) |
| | | | 1,775g | 5,210g | |
| Exp. 1 | 0 | 40 | 19 | — | 627 |
| Exp. 2 | 1.0 | 70 | 47 | — | 594 |
| Exp. 3 | 2.0 | 118 | 111 | — | 616 |
| Exp. 4 | 3.0 | 123 | Not Measurable | 39 | 573 |
| Exp. 5 | 7.0 | (Foamed violently and extrusion impossible) | | | |

EXAMPLE 2

The polyamide, the copolymer of ethylene series and the carbonate described in Example 1 were used in the proportion shown in Table 2, molten and mixed at 270° C using a 70mmφ extruder (L/D = 30).

The polyamide compositions thus obtained were then examined to measure their Izod impact strength, melt flow rates and tensile yielding strength. A result of the measurement is shown in Table 2.

Table 2

| Exp. No. | Amount of polyamide used (kg) | Amount of copolymer of ethylene series used (kg) | Copolymer of ethylene series wt%* | Amount of ethylene carbonate used (kg) | Physical properties | | | |
|---|---|---|---|---|---|---|---|---|
| | | | | | Izod impact strength (kgcm/cm) | melt flow rage | | Tensile yielding strength (kg/cm²) |
| | | | | | | 1,775 g | 5,210 g | |
| Exp. 6 | 22.5 | 2.5 | 10 | 0.5 | 26 | — | — | 688 |
| Exp. 7 | 20.0 | 5.0 | 20 | " | 118 | 111 | — | 616 |
| Exp. 8 | 17.5 | 7.5 | 30 | " | 132 | Not measurable | 24 | 4 |

Table 2-continued

| Exp. No. | Amount of polyamide used (kg) | Amount of copolymer of ethylene series used (kg) | Copolymer of ethylene series wt%* | Amount of ethylene carbonate used (kg) | Izod impact strength (kgcm/cm) | melt flow rage 1,775 g | melt flow rage 5,210 g | Tensile yielding strength (kg/cm²) |
|---|---|---|---|---|---|---|---|---|
| Exp. 9 | 15.0 | 10.0 | 40 | " | 133 | " | 47 | 394 |

$$* \frac{[\text{Copolymer of ethylene series}]\text{wt}}{[\text{Polyamide}]\text{wt} + [\text{Copolymer of ethylene series}]\text{wt}} \times 100$$

EXAMPLE 3

[Polyamide]

Polycaprolactam
Relative viscosity in 95.5% sulfuric acid (JIS-K-6810) : 2.4
Terminal groups : Amino groups 50 meq/kg Carboxyl groups 70 meq/kg 20.0 Kilograms of the above polyamide, 5.0 kg of the copolymer of ethylene series and 0.5 kg of the ethylene carbonate used in Example 1 were molten and mixed at 260° C using a 70 mmφ extruder (L/D = 30) (Exp. 11). A mixture of 20.0 kg of the polyamide and 5.0 kg of the copolymer of ethylene series alone was also molten and mixed (Exp. 10) for comparison.

The polyamide compositions thus obtained were then examined to measure their Izod impact strength and tensile yielding strength. A result of the measurement is shown in Table 3.

Table 3

| Exp. No. | Ethylene carbonate (PHR) | Izod impact strength (kgcm/cm) | Tensile yielding strength (kg/cm²) |
|---|---|---|---|
| Exp. 10 | 0 | 31 | 556 |
| Exp. 11 | 2.0 | 124 | 520 |

EXAMPLE 4

[Polyamide]

A polycondensate of hexamethylene adipate and caprolactam in which the ratio by weight of both monomer units is 90/10.
Relative viscosity in formic acid (JIS-K-6810) : 43
Peak temperature of melt heat absorption according to a differential scanning colorimeter (Parkinelmer) : 223° C (scanning rate: 16° C/min)

20.0 Kilograms of the above polyamide were incorporated with 5.0 kg of the copolymer of ethylene series and 0.50 kg of the ethylene carbonate used in Example 1 and the resultant composition was molten and mixed at a temperature of 260° C using a 70 mmφ extruder (L/D = 30) (Exp. 13). A mixture of 20.0 kg of the polyamide and 5.0 kg of the copolymer of ethylene series alone was also molten and mixed (Exp. 12) for comparison.

The polyamide compositions thus obtained were then examined to measure their Izod impact strength and tensile yielding strength. A result of the measurement is shown in Table 4.

Table 4

| Exp. No. | Ethylene carbonate (PHR) | Izod impact strength (kgcm/cm) | Tensile yielding strength (kg/cm²) |
|---|---|---|---|
| Exp. 12 | 0 | 32 | 566 |
| Exp. 13 | 2.0 | 114 | 529 |

EXAMPLE 5

[Copolymer of ethylene series]

A copolymer of ethylene with methacrylic acid having the following characteristics, the carboxyl groups of which are partly converted into zinc carbozylate groups Ethylene unit (mol%): 95.4
Methacrylic acid unit (mol %): 4.6
Neutralization degree = $\frac{[\text{COOZ}]\text{mol}}{[\text{COOH}]\text{mol} + [\text{COOZn}]\text{mol}} \times 100 : 10.3$
Melt index (g/10 min.): 5.4 (190° C: 2.16 kg)

20.0 Kilograms of the polyamide were incorporated with 5.0 kg of the above mentioned copolymer of ethylene series and 0.5 kg of ethylene carbonate and the resulting composition was molten and mixed at a temperature of 270° C using a 70 mmφ extruder (L/D = 30) (Exp. 15). A mixture of 20.0 kg of the polyamide and 5.0 kg of the copolymer of ethylene series alone was also molten and mixed Exp. 14) for comparison.

The polyamide compositions thus obtained were then examined to measure their Izod impact strength and tensile yielding strength. A result of the measurement is shown in Table 5.

Table 5

| Exp. No. | Ethylene carbonate (PHR) | Izod impact strength (kgcm/cm) | Tensile yielding strength (kg/cm²) |
|---|---|---|---|
| Exp. 14 | 0 | 19 | 593 |
| Exp. 15 | 2.0 | 65 | 588 |

EXAMPLE 6

A composition composed of 17 kg of the polyamide used in Example 1, 3.0 kg of the copolymer of ethylene series used in Example 1 and 0.25 kg of the ethylene carbonate (Exp. 16) and the composition incorporated further with 0.125 kg of gycerol (Exp. 17) were molten and mixed at a temperature of 270° C using a 70 mmφ extruder (L/D = 30). The resultant polyamide compositions were examined to measure their melt flow rates, Izod impact strength and tensile break strength. A result of the measurement is shown in Table 6.

Table 6

| Exp. No. | Glycerol (PHR) | Melt flow rate 1775 g (sec) | Izod impact strength (kg.cm/cm) | Tensile break strength (kg/cm²) |
|---|---|---|---|---|
| Exp. 16 | 0 | 18.1 | 30 | 648 |
| Exp. 17 | 0.5 | 11.7 | 28 | 653 |

EXAMPLE 7

15 kilograms of the polyamide composition obtained in Exp. 3 were incorporated with 7.4 kg of glass fibers (AFG CS 06 MA 411 manufactured by Asahi Glass KK, Japan) and then molten and mixed at a temperature of 290° C, using a 70 mmφ extruder (L/D = 30), to produce a glass fibers-reinforced polyamide composition (Exp. 19).

Another glass fibers-reinforced polyamide composition (Exp. 18) was also produced in the same manner as described above except that the polyamide composition obtained in Exp. 1 was used in place of that obtained in Experiment 3.

The glass fibers-reinforced polyamide compositions thus obtained were examined to measure their Dart impact strength, Drop hammer impact strength, Izod impact strength and tensile break strength. A result of the measurement is shown in Table 7.

Table 7

| Exp. No. | Ethylene carbonate (PHR) | Physical properties | | |
|---|---|---|---|---|
| | | Drop hammer impact strength (kg.cm) | Izod impact strength (kg.cm/cm) | Tensile break strength (kg/cm²) |
| Exp. 18 | 0 | 23 | 11 | 1260 |
| Exp. 19 | 2.0 | 56 | 19 | 1470 |

EXAMPLE 8

15.0 Kilograms of the polyamide composition oblained in Exp. 3 were incorporated with 10 kg of a mineral powder (Wollastonite, P-1 manufactured by Interpace, U.S.A. and the resultant composition was molten and mixed at a temperature of 290° C, using a 70 mmφ extender (L/D = 30), to produce an inorganic substance-reinforced polyamide composition (Exp. 21).

Another inorganic substance-reinforced polyamide composition (Exp. 20) was also produced in the same manner as described above except that the polyamide conposition obtained in Exp. 1 was used in place of that obtained in Exp. 3.

The glass fibers-reinforced polyamide compositions thus obtained were examined to measure their Dart impact strength, Izod impact strength and tensile break strength. A result of the measurement is shown in Table 8.

Table 8

| Exp. No. | Ethylene catbonate (PHR) | Physical properties | | |
|---|---|---|---|---|
| | | Drop hammer impact strength (kg.cm) | Izod impact strength (kg. cm/cm) | Tensile break strength (kg/cm²) |
| Exp. 20 | 0 | 36 | 4.8 | 710 |
| Exp. 21 | 2.0 | 228 | 8.8 | 710 |

EXAMPLE 9

20 Kilograms of the polyamide used in Example 1 were incorporated with 5 kg of the copolymer of ethylene series and 0.5 kg of propylene carbonate and the resultant composition was molten and mixed at a temperature of 270° C using a 70 mmφ extruder (Exp. 22)

The polyamide composition thus obtained was examined together with the composition of Exp. 1 to measure their Izod impact strength and tensile yielding strength. A result of the measurement is shown in Table 9.

Table 9

| Exp. No. | Propylene carbonate (PHR) | Physical properties | |
|---|---|---|---|
| | | Izod impact strength (kg.cm/cm) | Tensile yielding strength (Kg/cm²) |
| Exp. 1 | 0 | 40 | 627 |
| Exp. 22 | 2.0 | 52 | 591 |

EXAMPLE 10

20 Kilograms of the polyamide used in Example 1 were incorporated with 5 kg of the copolymer of ethylene series and 0.5 kg of butyl glycidyl ether and the resultant composition was molten and mixed at a temperature of 270° C, using a 70 mmφ extruder, to produce a polyamide composition (Exp. 23).

Another polyamide composition (Exp. 24) was also produced in the same manner as described above except that 2-ethylhexyl glycidyl ether was used in place of the butyl glycidyl ether.

The polyamide compositions thus obtained were examined together with the composition of Exp. 1 to measure their Izod impact strength and tensile yielding strength. A result of the measurement is shown in Table 10.

Table 10

| Exp. No. | Epoxy compound (compound name) (PHR) | Physical properties | |
|---|---|---|---|
| | | Izod impact strength (kg.cm/cm) | Tensile Yielding strength (kg/cm²) |
| Exp. 1 | — | 40 | 627 |
| Exp. 23 | Butyl glycidyl ether 2.0 | >130 | 538 |
| Exp. 24 | 2-Ethylhexyl glycidyl ether 2.0 | 61 | 544 |

What is claimed is:

1. A high impact strength polyamide composition comprised of 65-95 parts by weight of polyamide; 35-5 parts by weight of an ethylene series copolymer of ethylenic hydrocarbon and unsaturated carboxylic acid, wherein a part of the carboxyl groups on the acid has been converted into metal salts thereof; and 0.1-5 parts by weight of at least one compound selected from the group consisting of a monoepoxy compound and a carbonate compound of the formula:

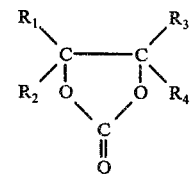

wherein $R_1$, $R_2$, $R_3$ and $R_4$ are the same or different and each stands for a hydrogen atom or an alkyl group per 100 parts by weight of total quantity of said polyamide and ethylene series copolymer.

2. A polyamide composition according to claim 1 wherein said mixture of said polyamide and said copolymer of ethylene series are comprised of 70-85 parts by weight of said polyamide and 30-15 parts by weight of said copolymer of ethylene series.

3. A polyamide composition according to claim 1 wherein said mixture of said polyamide and said copolymer of ethylene series has incorporated thereinto 0.5-3 parts by weight of at least one member selected from the group consisting of said carbonate compound and said epoxy compound.

4. A polyamide composition according to claim 1 wherein said polyamide is at least one member selected from the group consisting of polyhexamethyleneadipamide, polycaprolactam and a copolymer of hexamethyleneadipamide with caprolactam.

5. A polyamide composition according to claim 1 wherein said copolymer of ethylene series contains an ethylenic hydrocarbon component, an unsaturated carboxylic acid component and a metal salt of an unsaturated carboxylic acid component.

6. A polyamide composition according to claim 5 wherein said ethylenic hydrocarbon component is ethylene.

7. A polyamide composition according to claim 5 wherein said ethylenic hydrocarbon component in said copolymer of ethylene series is 85–98 mol%.

8. A polyamide composition according to claim 5 wherein said unsaturated carboxylic acid or a metal salt thereof has 3–8 carbon atoms.

9. A polyamide composition according to claim 8 wherein said unsaturated carboxylic acid is acrylic acid, methacrylic acid, α-ethylacrylic acid, maleic acid or itaconic acid.

10. A polyamide composition according to claim 1 wherein said carbonate compound is ethylene carbonate, propylene carbonate or butylene carbonate.

11. A polyamide composition according to claim 5 wherein said metal of said unsaturated carboxylic acid metal salt is Na, K, Mg, Ca, Ba or Zn.

12. A polyamide composition according to claim 1 wherein said epoxy compound is a glycidyl ether, a glycidyl ester, an alicyclic epoxide or an epoxyalkane.

13. A polyamide composition according to claim 1 wherein said mixture of said polyamide and said copolymer of ethylene series contains 0.1–3.0 % by weight of a plasticizer.

14. A polyamide composition according to claim 13 wherein said plasticizer is at least one member selected from the group consisting of glycerol, monostearic acid glyceride, distearic acid glyceride, tristearic acid glyceride, polyethyleneglycol, higher alcohols and ethylene-bis(stearylamide).

15. A polyamide composition according to claim 1 wherein said mixture of said polyamide and said copolymer of ethylene series contains 20–150% by weight of a reinforcing inorganic substance.

16. A polyamide composition according to claim 15 wherein said inorganic substance is at least one member selected from the group consisting of glass fibers, glass beads, calcium silicate, magnesium silicate, aluminum silicate, diatomaceous earth, magnesium phosphate, titanium phosphate, calcium carbonate, calcium sulfate, calcium sulfite, magnesium hydroxide, aluminum chloride, titanium chloride and asbestos.

17. A polyamide composition of claim 1 wherein the molar ratio of the metal salt to that of a total of the unsaturated carboxylic acid and the metal salt of unsaturated carboxylic acid is 5–90%.

* * * * *

UNITED STATES PATENT AND TRADEMARK OFFICE
CERTIFICATE OF CORRECTION

PATENT NO. : 4,086,295
DATED : April 25, 1978
INVENTOR(S) : Taketoshi Mori et al It is certified that error appears in the above-identified patent and that said Letters Patent are hereby corrected as shown below:

Column 1, line 21, "inpact" should read -- impact --.

Column 2, line 65, "includes" should read -- include --.

Column 3, line 30, insert -- ◯ -- after "$R_7$".

Column 4, line 53, "thin" should read -- twin --.

Column 5, line 54, insert -- 280°C -- after "DH".

Column 8, line 23, "$\overline{[COOZ]}$ mol" should read -- [COOZn] mol--

Signed and Sealed this

*Seventh* Day of *November 1978*

[SEAL]

Attest:

RUTH C. MASON
*Attesting Officer*

DONALD W. BANNER
*Commissioner of Patents and Trademarks*